United States Patent
Foryan

(10) Patent No.: US 8,308,410 B2
(45) Date of Patent: Nov. 13, 2012

(54) TIE DOWN WINCH SYSTEM AND ASSOCIATED METHODS

(76) Inventor: Steve Foryan, Moses Lake, WA (US)

( * ) Notice: Subject to any disclaimer, the term of this patent is extended or adjusted under 35 U.S.C. 154(b) by 44 days.

(21) Appl. No.: 12/967,224

(22) Filed: Dec. 14, 2010

(65) Prior Publication Data

US 2011/0150595 A1    Jun. 23, 2011

Related U.S. Application Data

(60) Provisional application No. 61/284,377, filed on Dec. 17, 2009.

(51) Int. Cl.
*B61D 45/00* (2006.01)
(52) U.S. Cl. ........................................... 410/103
(58) Field of Classification Search ............... 410/100, 410/103, 12, 96, 97, 156
See application file for complete search history.

(56) References Cited

U.S. PATENT DOCUMENTS

| | | | |
|---|---|---|---|
| 3,255,647 A | 6/1966 | Gray | |
| 3,428,331 A | 2/1969 | Morgan | |
| 3,589,304 A | 6/1971 | Haynes | |
| 3,650,222 A | 3/1972 | Broling | |
| 4,475,854 A | 10/1984 | Ericsson | |
| 4,510,652 A | 4/1985 | van Iperen | |
| 5,314,275 A | 5/1994 | Cottrell et al. | |
| 5,636,829 A | 6/1997 | Whiteman | |
| 6,467,755 B2 | 10/2002 | Reilly | |
| 6,626,621 B1 | 9/2003 | Hugg | |
| 6,705,597 B1 | 3/2004 | Reilly | |
| 6,758,644 B1 | 7/2004 | Vick | |
| 6,824,339 B1 | 11/2004 | Childers | |
| 6,981,827 B2 | 1/2006 | Bullock | |
| 7,192,009 B2 | 3/2007 | Massey | |
| 7,258,324 B2 | 8/2007 | Gilman | |
| 7,278,808 B1 | 10/2007 | Sisk | |
| 7,410,334 B2 | 8/2008 | McGrew | |
| 7,410,336 B2 | 8/2008 | Parks | |
| 7,464,916 B1 | 12/2008 | Drinkhorn | |
| 7,484,917 B2 | 2/2009 | Howes | |
| 7,566,194 B1 | 7/2009 | Gray | |
| 7,585,140 B1 | 9/2009 | Howes et al. | |
| 2003/0215301 A1 | 11/2003 | Guenther | |
| 2007/0048103 A1* | 3/2007 | Williams et al. | 410/100 |
| 2007/0217884 A1* | 9/2007 | McGrew | 410/100 |
| 2007/0264098 A1* | 11/2007 | Chou | 410/103 |
| 2007/0269285 A1* | 11/2007 | Leggett | 410/100 |
| 2008/0219794 A1* | 9/2008 | Booher | 410/100 |
| 2008/0303007 A1 | 12/2008 | Drinkhorn | |
| 2009/0074531 A1 | 3/2009 | Schmidt | |
| 2009/0162162 A1* | 6/2009 | Manesis | 410/100 |
| 2009/0196707 A1 | 8/2009 | Howes | |

* cited by examiner

*Primary Examiner* — H Gutman
(74) *Attorney, Agent, or Firm* — Mark R. Malek, Esq.; Eugene R. Quinn, Jr., Esq.; Zies Widerman & Malek

(57) ABSTRACT

A tie-down winch system includes a tie-down winch and a winch bar member. The tie-down winch includes frame, a cylinder member rotatably carried by the frame, a first lock member connected to a second end of the cylinder member, and a second lock member pivotally connected to the frame adjacent the second end of the cylinder member and moveable between an engaged position and a disengaged position. The engaged position is defined as a portion of the second lock member engaging a portion of the first lock member to prevent rotation of the cylinder member, and the disengaged position is defined as the second lock member being spaced apart from the first lock member so that the cylinder member is freely rotatable with respect to the frame.

15 Claims, 6 Drawing Sheets

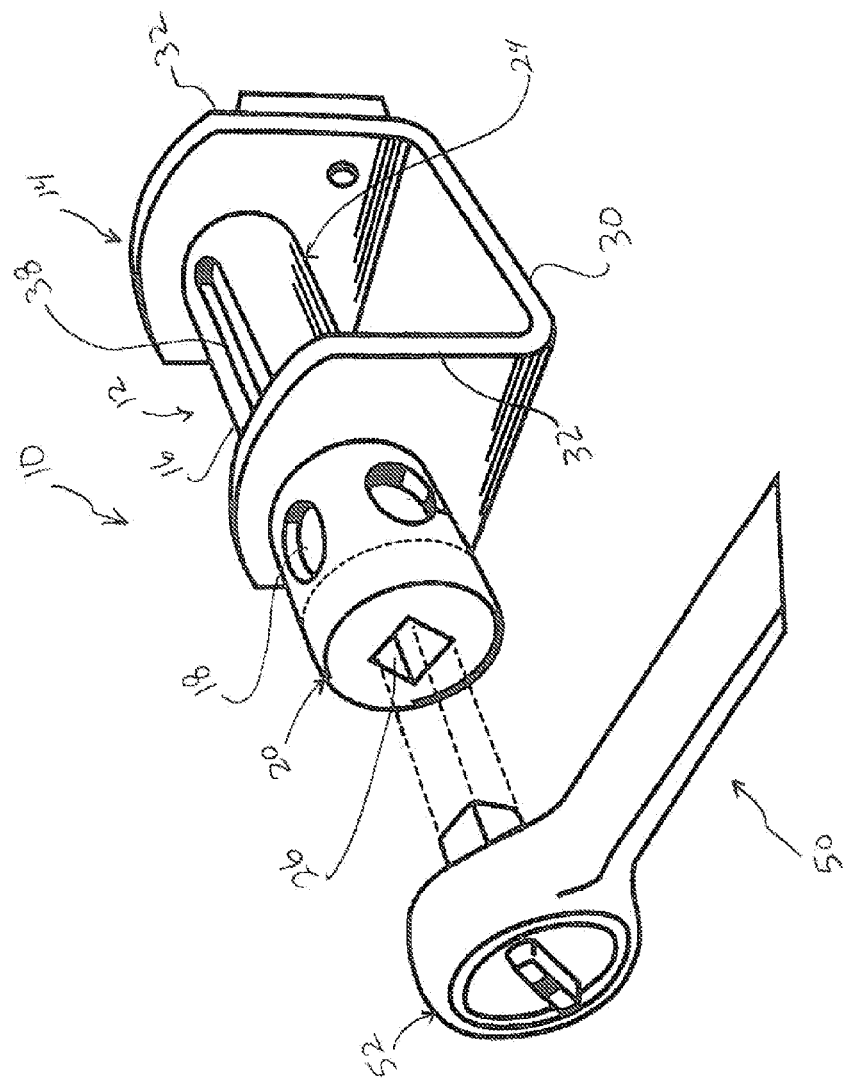

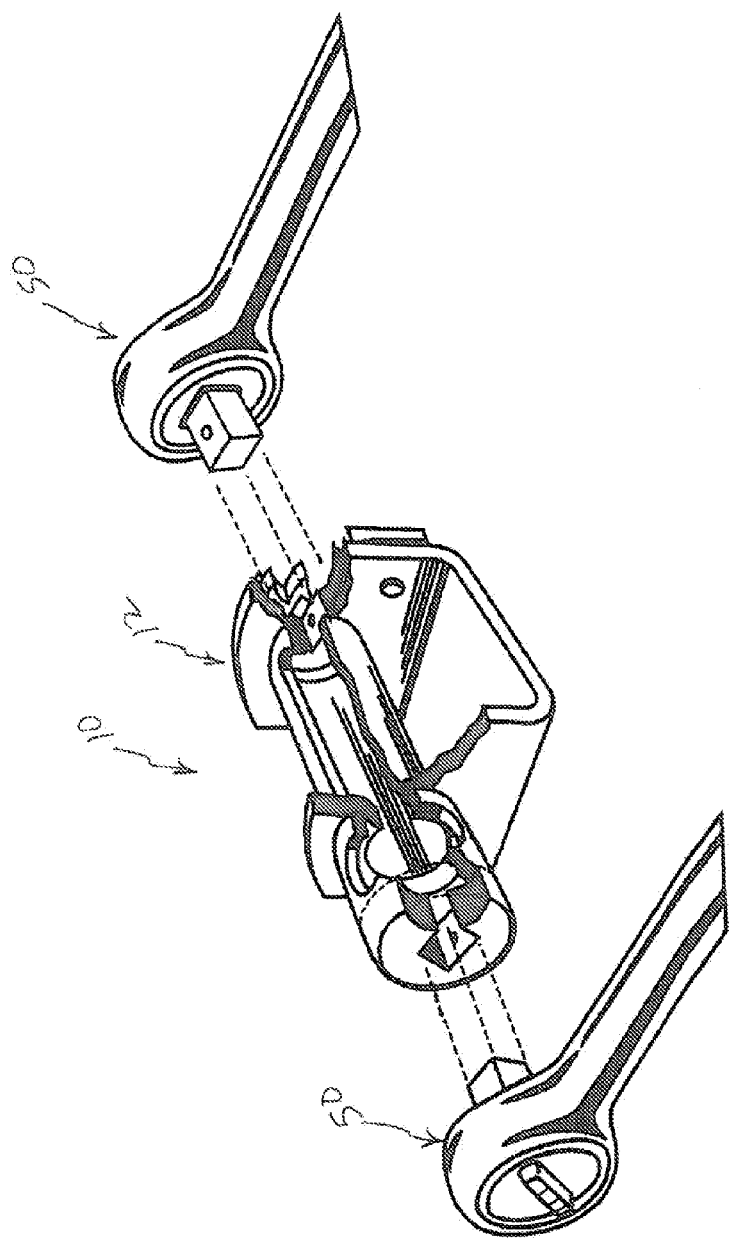

TIE DOWN WINCH SYSTEM AND ASSOCIATED METHODS

RELATED APPLICATIONS

This application is related to U.S. Provisional Patent Application No. 61/284,377, titled Cargo Tie-Down Winch, filed on Dec. 17, 2009 by the inventor of the current application, the entire contents of which are incorporated herein by reference.

FIELD OF THE INVENTION

The present invention relates generally to cargo tie-down winches and, in particular, to a tie-down winch for flatbed truck trailers adapted to allow either a cheater bar or a standard ratchet wrench to be used to operate the winch.

BACKGROUND OF THE INVENTION

Currently a number of solutions exist that attempt to improve upon standard cheater bar tie-down winches for use on flatbed trailers. Most of these solutions attempt to utilize the principle of a rotating ratchet tightening mechanism. However, many existing ratcheting solutions suffer from various drawbacks. In some systems a complete ratchet mechanism is manufactured right on the winch hub itself and is tightened by using a winch bar (e.g. a cheater bar). Such a solution is susceptible to failure due in part to the use of neoprene seals that become old and worn over time. These seals are eventually breached allowing lubricant to become hard or seep away (such seals may be breached due to exposure to heat from welding the winch in place during installation, bad weather conditions, or the rigorous daily use these winches receive on a continuous basis). Such an integrated ratchet mechanism includes more sensitive moving parts and is thus more likely to fail, wear out, seize up or malfunction during regular operation thus rendering the entire winch useless and requiring total replacement of the unit. In cases when straps become misaligned when in use or frozen (when wet) to the rotating cylinder or when excess tightening puts pressure between the winch cylinder and the holding bracket, this type of ratcheting mechanism cannot reverse to solve the problem. Such winches having integrated ratcheting mechanisms can also be very expensive to manufacture and to purchase, and carry a limited warranty.

Other solutions exist that allow for ratcheting of the winch by use of a standard external ratchet tool. These tools may have an advantage over the simple cheater bar 4 hole insert, but are cumbersome, loose fitting (thus requiring pins or bolts that can become worn or lost) and take more time when securing to the winch. Some winches are made with a square socket hole on one end for receiving a ratchet wrench but are not safe and secure when using a wrench. The socket hole is made shallow with a closed bottom end that usually does not let the insert square of the wrench to fully extend to its purposed length. The closed bottom end of the socket hole also makes the socket hole more susceptible to the collection of debris.

It would be desirable to have a winch device that allows for relatively faster and simpler operation than is possible with standard cheater bar type tie-down winch devices without suffering the drawbacks of known ratcheting tie-down winch devices. Therefore, there currently exists a need in the industry for an improved cargo tie-down winch device.

SUMMARY OF THE INVENTION

With the above in mind, the present invention advantageously provides a tie-down winch system that includes a tie-down winch and a winch bar that advantageously provides three different ways to tighten straps on a tie-down system. The present invention also advantageously decreases the time necessary to secure a load using a tie-down system. The present invention further advantageously provides a winch tie-down system that is strong and less likely to fail that known prior art winch tie-down systems. The present invention still further advantageously provides a tie-down winch that is less likely to get clogged with debris.

These and other advantages, features and benefits of the present invention are provided by a winch tie-down system including a tie-down winch and a winch bar. The tie-down winch may include a frame having a base, and a pair of opposing endwalls extending upwardly from the base. Each of the endwalls may have a passageway formed therethrough. The tie-down winch may also include a cylinder member rotatably carried by the frame.

The cylinder member may include a first end portion having a substantially polygonal cutout formed therein and a medial portion connected to the first end portion. The medial portion is substantially hollow. The cylinder member may also include a second end portion connected to the medial portion opposite the first end portion. The second end portion may have a substantially polygonal cutout formed therein. The medial portion of the cylinder member may be carried between the endwalls of the frame. The first and second end portions of the cylinder member may engage the passageways formed through the endwalls of the frame.

The tie-down winch may also include a first lock member and a second lock member. The first lock member may be connected to the second end of the cylinder member so that the first lock member is rotatable as the cylinder member rotates with respect to the frame. The second lock member may be pivotally connected to the frame adjacent the second end of the cylinder member and moveable between an engaged position and a disengaged position. The engaged position may be defined as a portion of the second lock member engaging a portion of the first lock member to prevent rotation of the cylinder member. The disengaged position may be defined as the second lock member being spaced apart from the first lock member so that the cylinder member is freely rotatable with respect to the frame.

The first end portion and the second end portion of the cylinder member may each be defined as having an end and peripheral sidewalls extending from the end towards the medial portion of the cylinder member. The first end portion and the second end portion of the cylinder member may include a plurality of passageways formed through the peripheral sidewalls. The plurality of passageways formed through the peripheral sidewalls of each of the first and second end portions of the cylinder member may include a pair of intersecting passageways formed through the peripheral sidewalls. The pair of intersecting passageways are adapted to receive a winch bar member.

The substantially polygonal cutouts formed in each of the first and second end portions may be square cutouts that may be adapted to receive a ratchet wrench. The square cutout may include a lock member carried thereby. The lock member that may be carried by each of the square cutouts may be defined as a ball/cup lock mechanism. The first end portion, the medial end portion and the second end portion of the cylinder member may be integrally formed as a monolithic unit.

The polygonal cutout formed in the first and second end portions may be continuous with the hollow medial portion so that a continuous passageway is formed and defined by the polygonal cutout formed in the first and second end portions of the cylinder member and the hollow medial portion of the cylinder member. The medial portion of the cylinder member may include a strap receiving passageway formed therethrough for receiving an end portion of a strap.

The winch bar member may be adapted to engage the tie-down winch to rotate the cylinder member. The winch bar member may include a first end portion, a medial portion and a second end portion. The winch bar may also include a ratchet wrench assembly carried by the first end portion. The ratchet wrench assembly may be adapted to engage the polygonal cutouts formed in the first and second end portions of the cylinder member. The winch bar member may also include a cylindrical protrusion carried by the second end portion. The cylindrical protrusion may be adapted to selectively engage portions of the first end portion and the second end portion of the cylinder member. The medial portion of the winch bar member may include a textured surface.

A method aspect of the present invention is for tying down a load using the tie-down winch system. The method may include selectively engaging a portion of the winch bar member with a portion of the tie-down winch. The method may also include rotating the winch bar member to cause rotation of a portion of the tie-down winch.

BRIEF DESCRIPTION OF THE DRAWINGS

FIG. 1A is a diagram illustrating a perspective view of a tie-down winch device and wrench in accordance with an exemplary embodiment of the invention.

FIG. 3B is a diagram illustrating a perspective section view of the exemplary tie-down winch device of FIG. 1A along with two wrench insertion points and a cheater bar insertion point.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is directed to a tie-down winch used for securing a load on a flatbed trailer (mounted e.g. on each side of the flatbed) that is adapted to allow use of a cheater bar and/or a standard ratchet wrench for tightening and cinching tie-down straps over the load.

Figure 1B:
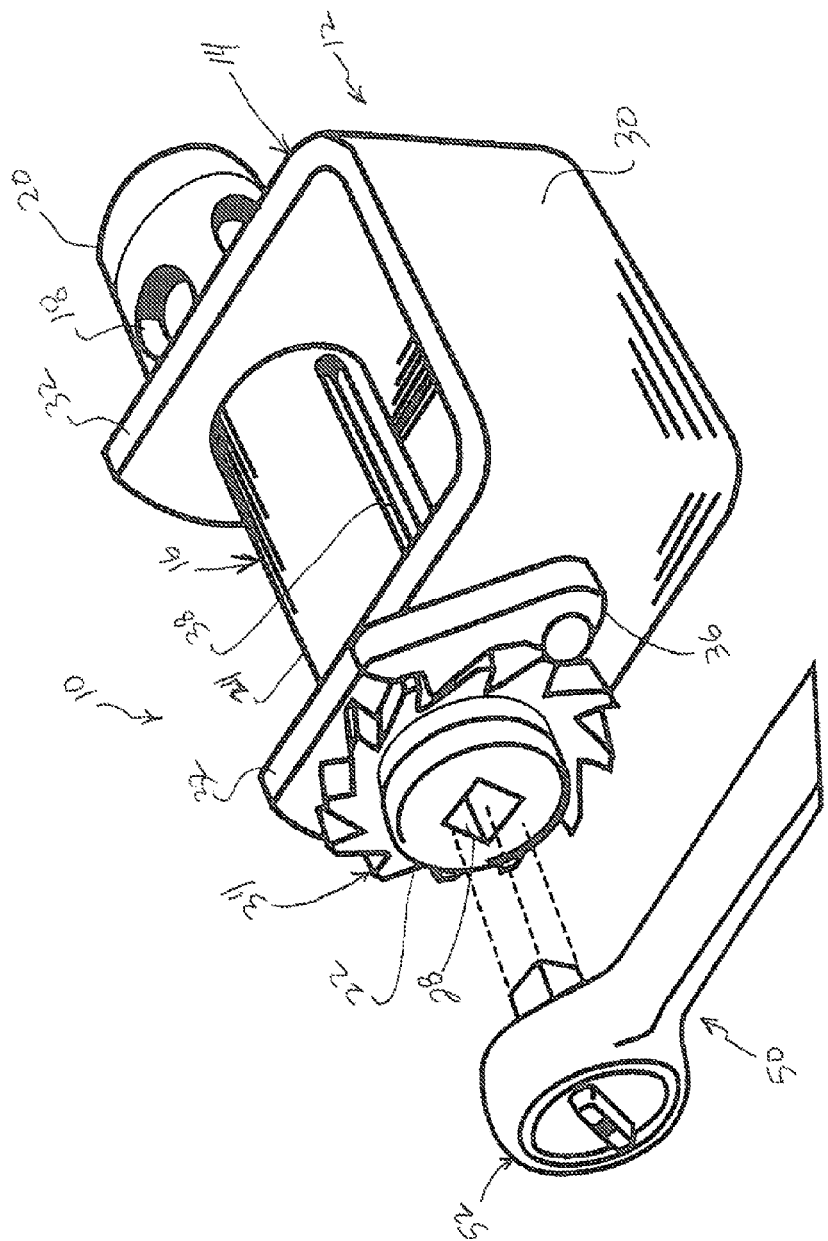
FIG. 1B is a diagram illustrating another perspective view of the exemplary tie-down winch device and wrench of FIG. 1A.

Referring initially to FIG. 1A and FIG. 1B, diagrams are shown illustrating perspective views of a tie-down winch 12 in accordance with an exemplary embodiment of the invention. As shown, FIG. 1A illustrates a perspective view of a first end of the tie-down winch 12. FIG. 2A illustrates a perspective view of a second end of the tie-down winch 12. As shown, the winch device has a U-shaped frame 14 or bracket and a hollow cylinder 16 such as a mandrel that is rotatably configured through parallel sections of the U-shaped bracket. The rotatable cylinder 16 is sufficiently wide to receive a tie-down belt commonly used for securing a load on a flatbed trailer. The tie-down belt may be a nylon belt approximately 4 inches wide. By way of example, the rotatable cylinder 16 may have an overall length of approximately 9 inches and a diameter of approximately 2 inches. The rotatable cylinder 16 has at least two and preferably four winch bar insertion holes 18 circumferentially disposed about the first end 20 of the rotatable cylinder 16. The holes 18 may be arranged in pairs to allow a first circular end of a winch bar member 50 (e.g. a cheater bar) to be simultaneously inserted through two holes. The circumferentially disposed holes 18 thus provide a first means for operating and tightening the exemplary tie-down winch 12.

The first end 30 of the rotating cylinder 16 also includes a square socket cutout 26 (socket insert) positioned to allow a standard square fitting of a standard ratchet wrench to be longitudinally inserted into the first end 20 of the cylinder 16. The square socket cutout 26 extends through to the hollow section of the cylindrical cutout thereby allowing the square fitting of the ratchet wrench to be fully inserted into the rotatable cylinder. The square socket cutout 26 may also include a ball/cup lock mechanism (not shown) configured to allow a standard ratchet wrench socket fitting to lock securely in place when inserted into the square socket cutout section. By way of example, the square socket cutout 26 may be sized to receive a 0.75 inch square fitting or an inch square fitting that would be found on a 0.75 inch or 1 inch ratchet wrench respectively. The square socket cutout 26 thus provides a second means for operating and tightening the exemplary tie-down winch.

It is noted that the first end of the rotatable cylinder 16 may be manufactured and formed as a single piece of metal, i.e., a monolithic unit, or as an end cap that includes the square socket cutout. The end cap is preferably fixedly attached to the end of the rotatable cylinder 12 e.g. by welding, press-fitting or similar fastening means.

As shown in FIG. 1B, the second end 22 of the rotatable cylinder 16 includes a locking gear (or sprocket) fixedly disposed about the circumference of the second end of the rotatable cylinder and a pawl (or dog lock) pivotally attached to the U-shaped bracket and positioned to rest inside the locking gear to prevent the winch from rotating backwards while being tightened. The second end 22 of the rotating cylinder 16 may also include a square cutout 28 positioned to allow a square fitting of a standard ratchet wrench to be longitudinally inserted into the second end of the rotatable cylinder. The square socket cutout 28 also extends through to the hollow section of the cylindrical cutout thereby allowing the square fitting of the ratchet wrench to be fully inserted into the rotatable cylinder 16. The square socket cutout 28 at the second end 22 of the rotating cylinder 16 may also include a ball and cup lock mechanism and may also be sized to receive a 0.75 inch square fitting or an inch square fitting that would be found on a 0.75 inch or 1 inch ratchet wrench respectively. The second end 22 may also be formed as an end cap welded or pressed in place. The square socket cutout 28 disposed at the second end thus provides a third means for operating and tightening the exemplary tie-down winch. By way of example, each of the components of the winch device may be comprised of a metal such as high-grade intense steel.

Figure 2B:
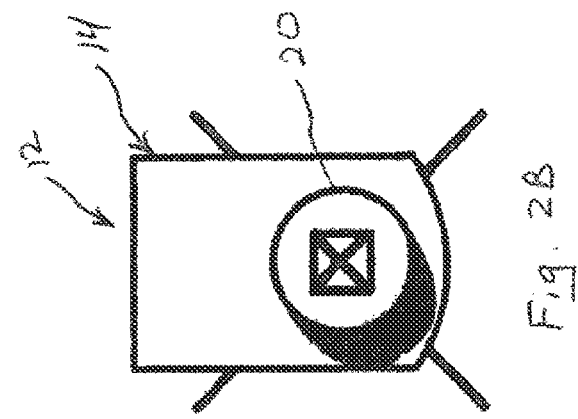
FIG. 2B is a diagram illustrating an end view of the exemplary tie-down winch device of FIG. 1A.
Figure 2A:
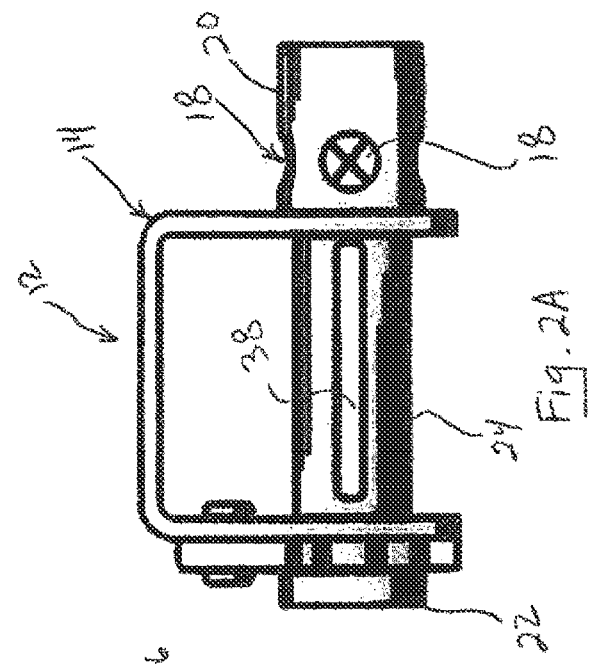
FIG. 2A is a diagram illustrating a side view of the exemplary tie-down winch device of FIG. 1A.
Figure 2C:
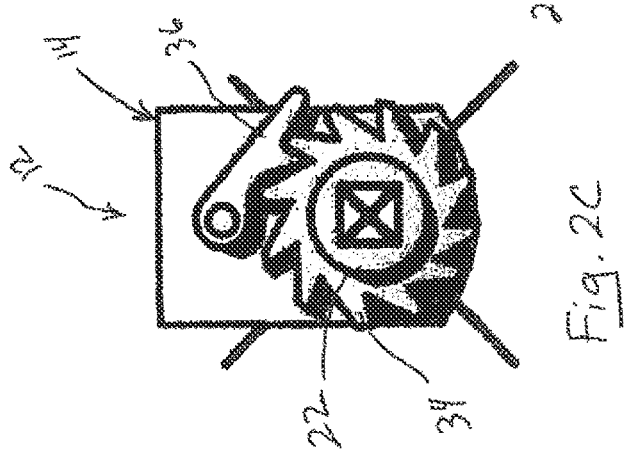
FIG. 2C is a diagram illustrating another end view of the exemplary tie-down winch device of FIG. 1A.

Referring now to FIG. 2A, FIG. 2B and FIG. 2C diagrams are shown illustrating a side view and two end views of the exemplary tie-down winch 12 of FIG. 1A, FIG. 2B illustrates an end view of the first end 20 of the cylinder member 16 of the tie-down winch 12. As shown, the square socket cutout 26 section adapted to receive a standard ratchet wrench socket fitting is hollow through to the hollow section of the rotatable cylinder 16. This mitigates the amount of debris that can build up in the socket cutout thereby reducing the need for maintenance and providing for safer operation of the winch. FIG. 2C illustrates an end view of the second end of the exemplary tie-down winch 12. This illustrates another square socket cutout 28 section similarly adapted to receive a standard ratchet wrench socket fitting. The socket cutout 28 at the second end 22 of the rotatable cylinder 16 is also hollow through to the hollow section of the rotatable cylinder. This again mitigates the amount of debris that can build up in the socket cutout also reducing the need for maintenance and providing for safer operation of the winch. As shown, the rotatable cylinder 16 (or mandrel spool) also includes an exterior opening which further facilitates easy removal of debris from the hollow sections of the mandrel and the square socket cutout.

Figure 3A:
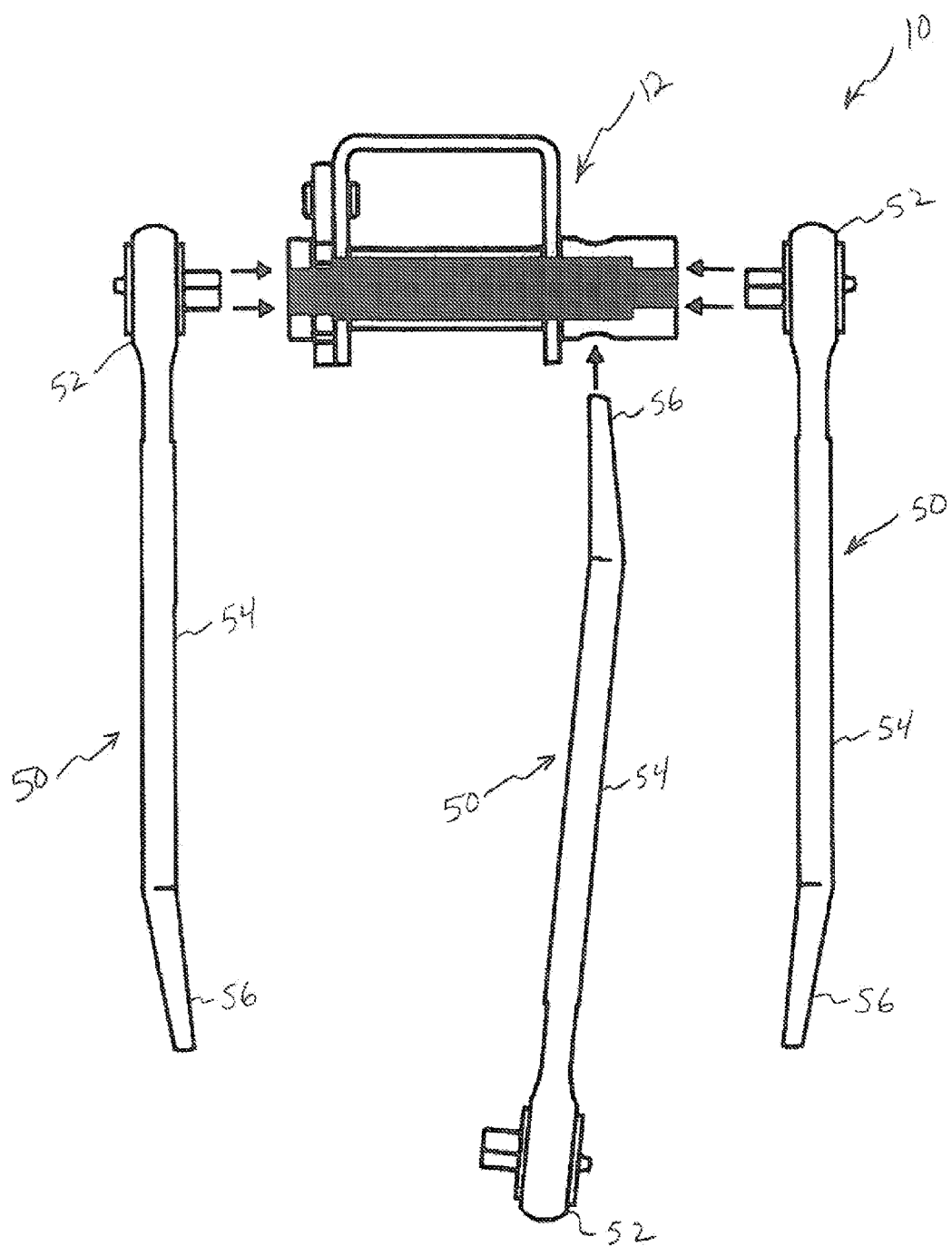
FIG. 3A is a diagram illustrating a section view of the exemplary tie-down winch device of FIG. 1A along with two wrench insertion points and a cheater bar insertion point.

Referring now to FIG. 3A and FIG. 3B, a respective side view and a perspective section view of the exemplary tie-down winch 12 is shown illustrating various means for operation with a winch bar or ratchet wrench. The tie-down winch 12 may be operated by inserting a ratchet wrench into either the first end 20 or second end 22 of the rotatable cylinder 16. The tie-down winch 12 may also be operated by inserting a winch bar (e.g. a cheater bar) into the winch bar insertion holes 18 located at the first end 20 of the rotatable cylinder 16. The contemplated tie-down winch 12 thus provides three separate means for rotating the rotatable cylinder 16 (or mandrel). Each of these means may be employed separately depending on the tool (either a winch bar or ratchet wrench) available to an operator. The means for rotating the cylinder 16 may also be employed in tandem when multiple tools are available, thus providing additional leverage. The means for rotating the rotatable cylinder 16 may also be employed in sequence depending on the leverage desired and the current positioning of the rotatable cylinder 16.

Figure 4:
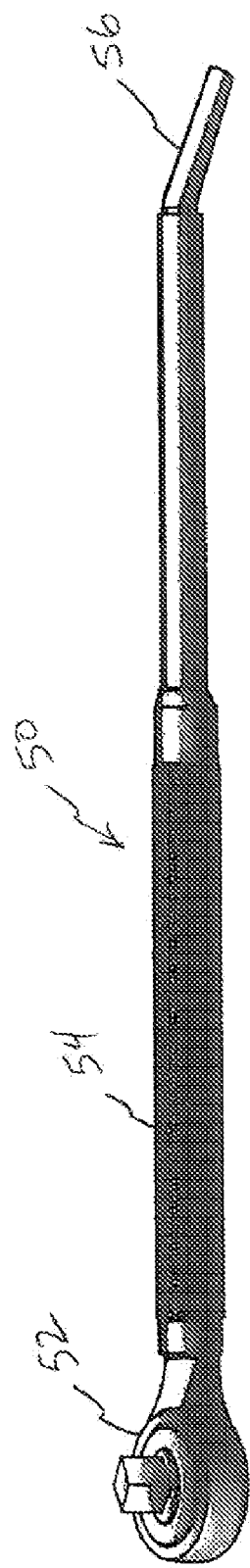
FIG. 4 is a diagram illustrating a perspective view of a combination winch bar and ratchet wrench in accordance with an exemplary embodiment of the invention.

Referring now to FIG. 4, a diagram is shown illustrating a perspective view of a winch bar member 50 of the tie-down winch system 10 in accordance with an exemplary embodiment of the invention. As shown, the winch bar member 50 is contemplated for use with the exemplary tie-down winch 12 of the tie-down winch system 10. The winch bar member 50 illustratively includes a ratchet wrench assembly 52 at a first end portion thereof. By way of example, the ratchet wrench assembly 52 may be a 0.75 inch or 1 inch ratchet wrench. The winch bar member 50 also includes a cylindrical protrusion 56 at a second end portion thereof. The cylindrical protrusion 56 is preferably sized to fit within the winch bar insertion holes 18 of the tie-down winch 12 previously described. The winch bar member 50 also includes a knurled section for providing a surface that can be easily gripped by an operator adjacent a medial portion 54 thereof. The knurled section is perhaps best described as a textured surface adjacent the medial portion 54 of the winch bar member 50. By way of example the winch bar member 50 may be approximately 36 inches in length.

An improved tie-down winch 12 and winch bar member 50 of a tie-down winch system 10 is thus contemplated. The tie-down winch 12 advantageously provides three separate means for tightening the winch using a winch bar, a ratchet wrench or the contemplated winch bar member 50 according to the present invention. The tie-down winch 12 allows for operation from either end thereof giving it more versatility for both right and left handed persons when using the device. The tie-down winch 12 saves an operator time when securing a load, is safer and works better in limited space relative to using a cheater bar alone. Use of a cheater bar alone sometimes requires the use of both hands on the cheater bar when tightening the winch and can fall out when in use if it is let go. For instance, during operation the tie-down strap often slides off the travel of the winch. Thus to maneuver the strap back in place, the operator will often take his hand off the cheater bar causing the cheater bar to fall out of the hole and land on the ground. Therefore, the operator frequently must stop, unlock a winch tie-down locking mechanism, pick up the cheater bar, reverse the strap and start all over again. An operator commonly has 10 or 12 winches to work with on either side of a flatbed thus resulting in an inefficient, time-consuming process. The contemplated tie-down winch allows a ratchet wrench to be used providing maneuverable leverage to tighten the winch by using only one hand thus freeing the other hand to perform other important maneuvers such as guiding the strap into its proper travel. Freeing the user from having to keep both hands on a tool (e.g. the cheater bar) thus results in a significantly less time-consuming and more efficient process. Unlike existing ratchet powered winches the contemplated winch also allows the use of a cheater bar. Thus if an operator breaks the ratchet wrench, or looses it, he can still tighten his load using the back handle of the contemplate combination ratchet wrench or a separate winch bar because of the inclusion of standard sized insertion holes. The tight security of the ratchet handle wrench provides better leverage capacities and better control when tightening the winch therefore mitigating the chances of an unwanted, serious injury. The cost to manufacture the contemplated winch device is less than devices that have integrated ratcheting mechanisms. The device is also more durable and reliable due to the limited number of moving parts required, thus allowing the device to carry a longer warranty.

Referring now back to the appended figures, additional details of the tie-down winch system 10 in accordance with an embodiment of the present invention is now described in greater detail. As illustrated, the tie-down winch system 10 according to the present invention preferably includes a tie-down winch 12 and a winch bar member 50. The tie-down winch 12 may include a frame 14 having a base 30, and a pair of opposing endwalls 32 extending upwardly from the base. Each of the endwalls 32 may have a passageway formed therethrough. The tie-down winch 12 may also include a cylinder member 16 rotatably carried by the frame 14.

The cylinder member 14 may include a first end portion 20 having a substantially polygonal cutout 26 formed therein, and a medial portion 24 connected to the first end portion. The medial portion 24 is substantially hollow. The cylinder member 16 may also include a second end portion 22 connected to the medial portion 24 opposite the first end portion 20. The second end portion 22 may have a substantially polygonal cutout 28 formed therein. The medial portion 24 of the cylinder member 16 may be carried between the endwalls 32 of the frame 14. The first and second end portions 20, 22 of the cylinder member 16 may engage the passageways formed through the endwalls 32 of the frame 14.

The tie-down winch 12 may also include a first lock member 34 and a second lock member 36. The first lock member 34 may be connected to the second end 22 of the cylinder member 16 so that the first lock member is rotatable as the cylinder member rotates with respect to the frame 14. The second lock member 36 may be pivotally connected to the frame 14 adjacent the second end 22 of the cylinder member 16 and moveable between an engaged position and a disengaged position. The engaged position may be defined as a portion of the second lock member 36 engaging a portion of the first lock member 34 to prevent rotation of the cylinder member 16. The disengaged position may be defined as the second lock member 36 being spaced apart from the first lock member 34 so that the cylinder member 16 is freely rotatable with respect to the frame 14. As described above, the first lock member 34 may be provided by, for example, a locking gear, or sprocket. As also described above, the second lock member 36 may be provided by a pawl, or dog lock. Those skilled in the art, after having had the benefit of reading this disclosure, will appreciate that engagement of the pawl (or dog lock) with the locking gear (or sprocket) prevents rotation of the cylinder member 16.

The first end portion 20 and the second end portion 22 of the cylinder member 16 may each be defined as having an end and peripheral sidewalls extending from the end towards the medial portion 24 of the cylinder member. The first end portion 20 and the second end portion 22 of the cylinder member 16 may include a plurality of passageways 18 formed through the peripheral sidewalls. The plurality of passageways 18 formed through the peripheral sidewalls of each of the first and second end portions 20, 22 of the cylinder member 16 may include a pair of intersecting passageways 18 formed through the peripheral sidewalls. The pair of intersecting passageways 18 are adapted to receive a portion of a winch bar member 50, according to the present invention.

The substantially polygonal cutouts 26, 28 formed in each of the first and second end portions 20, 22 of the cylinder member 16 may be square cutouts that may be adapted to receive a ratchet wrench of a winch bar member 50 according to the present invention. Those skilled in the art will appreciate, however, after having had the benefit of reading this disclosure, that any ratchet wrench may be used to tighten and loosen the tie-down winch 12 of the tie-down winch system 10 according to the present invention. The square cutouts 26, 28 of the first and second end portions 20, 22 of the cylinder member 16 may include a lock member (not shown) carried thereby. The lock member that may be carried by each of the square cutouts 26, 28 may be defined as a ball/cup lock mechanism. The first end portion 20, the medial portion 24 and the second end portion 22 of the cylinder member 16 may be integrally formed as a monolithic unit.

The polygonal cutouts 26, 28 formed in the first and second end portions 20, 22 of the cylinder member 16 may be continuous with the hollow medial portion so that a continuous passageway is formed and defined by the polygonal cutout formed in the first and second end portions of the cylinder member and the hollow medial portion of the cylinder member. The medial portion 24 of the cylinder member 16 may include a strap receiving passageway 38 formed therethrough for receiving an end portion of a strap.

The winch bar member 50 may be adapted to engage the tie-down winch 12 to rotate the cylinder member 16. The winch bar member 50 may include a first end portion 52, a medial portion 54 and a second end portion 56. The winch bar may also include a ratchet wrench assembly carried by the first end portion 52. The ratchet wrench assembly may be adapted to engage the polygonal cutouts 26, 28 formed in the first and second end portions 20, 22 of the cylinder member 16. The winch bar member 50 may also include a cylindrical protrusion carried by the second end portion 56. The cylindrical protrusion may be adapted to selectively engage the intersecting passageways 18 in the first end portion 20 of the cylinder member 16. The medial portion 54 of the winch bar member 50 may include a textured surface. As described above, the textured surface of the medial portion 54 of the winch bar member 50 may be described as a knurled section.

A method aspect of the present invention is for tying down a load using the tie-down winch system 10 according to the present invention. The method may include selectively engaging a portion of the winch bar member 50 with a portion of the tie-down winch 12. The method may also include rotating the winch bar member 50 to cause rotation of a portion of the tie-down winch 12.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A tie down winch comprising:
    a frame having a base, and a pair of opposing endwalls extending upwardly from the base, each of the endwalls having a passageway formed therethrough;
    a cylinder member rotatably carried by the frame, the cylinder member comprising:
        a first end portion having a substantially polygonal cutout formed therein,
        a medial portion connected to the first end portion, the medial portion having a void within a substantially solid peripheral, sidewall, and
        a second end portion connected to the medial portion opposite the first end portion,
        wherein the medial portion of the cylinder member is carried between the endwalls of the frame and the substantially solid peripheral sidewall of the medial portion includes at least one strap-receiving passageway formed therethrough,
        wherein the first and second end portions of the cylinder member engage the passageways formed through the endwalls of the frame, and
        wherein the substantially polygonal cutout formed in the first end portion is continuous with the void within the substantially solid peripheral sidewall of the medial portion so that a passageway is defined by the substantially polygonal cutout and the void;
    a first lock member connected to the second end portion of the cylinder member so that the first lock member is rotatable as the cylinder member rotates with respect to the frame; and
    a second lock member pivotally connected to the frame adjacent the second end portion of the cylinder member and moveable between an engaged position and a disengaged position, the engaged position being defined as a portion of the second lock member engaging a portion of the first lock member to prevent rotation of the cylinder member, and the disengaged position being defined as the second lock member being spaced apart from the first lock member so that the cylinder member is freely rotatable with respect to the frame.

2. A tie-down winch according to claim 1 wherein the first end portion and the second end portion of the cylinder member are each defined as having an end and peripheral sidewalls extending from the end towards the medial portion of the cylinder member; and wherein the first end portion of the cylinder member includes a plurality of passageways formed through the peripheral sidewalls.

3. A tie-down winch according to claim 2 wherein the plurality of passageways formed through the peripheral sidewalls of the first end portions of the cylinder member include at least one pair of substantially diametrically opposed passageways formed through the peripheral sidewalls; wherein each of the at least one pair of substantially diametrically opposed passageways is adapted to receive a winch bar member.

4. A tie-down winch according to claim 1 wherein the substantially polygonal cutout formed in the first end portion is a square cutout; and wherein the square cutout is adapted to receive a ratchet wrench.

5. A tie-down winch according to claim 1 wherein the cylinder member comprising the first end portion, the medial portion and the second end portion is integrally formed as a monolithic unit.

6. A tie-down winch according to claim 1 wherein the substantially solid peripheral sidewall of the medial portion of the cylinder member includes at least one pair of strap-receiving passageways formed therethrough and disposed in diametrical opposition.

7. A tie-down winch system comprising:
   a tie-down winch comprising
      a frame,
      a cylinder member rotatably carried by the frame, the cylinder member comprising
         a first end portion having a substantially polygonal cutout formed in an end portion thereof,
         a hollow medial portion with a substantially solid peripheral sidewall connected to the first end portion, and
         a second end portion connected to the substantially solid Peripheral sidewall of the hollow medial portion opposite the first end portion, the second end portion having a substantially polygonal cutout formed in an end portion thereof,
         wherein the substantially polygonal cutouts formed in each of the first and second end portions and combine with the hollow medial portion to define a continuous passageway through the cylinder member;
      a first lock member connected to the second end portion of the cylinder member so that the first lock member is rotatable as the cylinder member rotates with respect to the frame, and
      a second lock member pivotally connected to the frame adjacent the second end portion of the cylinder member and moveable between an engaged position and a disengaged position, the engaged position being defined as a portion of the second lock member engaging a portion of the first lock member to prevent rotation of the cylinder member, and the disengaged position being defined as the second lock member being spaced apart from the first lock member so that the cylinder member is freely rotatable with respect to the frame; and
   a winch bar member adapted to engage the tie-down winch to rotate the cylinder member, the winch bar member comprising
      a first end portion, a medial portion and a second end portion,
      a ratchet wrench assembly carried by the first end portion of the winch bar member, the ratchet wrench assembly adapted to engage the polygonal cutouts formed in the first and second end portions of the cylinder member, and
      a cylindrical protrusion carried by the second end portion of the winch bar member, the cylindrical protrusion adapted to selectively engage portions of the first end portion and the second end portion of the cylinder member,
      wherein, the medial portion of the winch bar member includes a textured surface.

8. A system according to claim 7 wherein the first end portion and the second end portion of the cylinder member are each defined as having an end and peripheral sidewalls extending from the end towards the medial portion of the cylinder member; and wherein the first end portion and the second end portion of the cylinder member include at least one pair of substantially diametrically opposed formed through the peripheral sidewalls; wherein each of the at least one pair of substantially diametrically opposed passageways is adapted to receive the cylindrical protrusion of the winch bar member.

9. A system according to claim 7 wherein the frame includes a base, and a pair of opposing endwalls extending upwardly from the base, each of the endwalls having a passageway formed therethrough; and wherein the cylinder member is adapted to engage the passageways formed through the endwalls so that the medial portion of the cylinder member is rotatably carried by the frame.

10. A system according to claim 7 wherein the medial portion of the cylinder member includes at least one strap-receiving passageway formed therethrough.

11. A method of using a tie-down winch system that includes a tie-down winch and a winch bar member,
    the tie-down winch comprising
       a frame,
       a cylinder member rotatably carried by the frame, the cylinder member comprising a first end portion, a hollow medial portion with a substantially solid peripheral sidewall connected to the first end portion, and a second end portion connected to the substantially solid peripheral sidewall of the hollow medial portion opposite the first end portion, the first and second end portions of the cylinder member each haying an end portion thereof and peripheral sidewalls extending from the end portion thereof towards the hollow medial portion of the cylinder member, the first and second end portions of the cylinder member each having at least one pair of substantially diametrically opposed passageways formed through the peripheral sidewalls thereof, the first and second end portions of the cylinder member each having a substantially polygonal cutout formed in the end portion thereof, the substantially polygonal cutouts formed in each of the first and second end portions of the cylinder member and the hollow medial portion of the cylinder member defining a continuous passageway through the cylinder member,
       a first lock member connected to the second end portion of the cylinder member so that the first lock member is rotatable as the cylinder member rotates with respect to the frame, and
       a second lock member pivotally connected to the frame adjacent the second end portion of the cylinder member and moveable between an engaged position and a disengaged position, the engaged position being defined as a portion of the second lock member engaging a portion of the first lock member to prevent rotation of the cylinder member, and the disengaged position being defined as the second lock member being disengaged from the first lock member so that the cylinder member is freely rotatable with respect to the frame; and the winch bar member comprising
- a first end portion, a medial portion, and a second end portion,
- a ratchet wrench assembly carried by the first end portion, the ratchet wrench assembly adapted to engage the polygonal cutouts formed in the first and second end portions of the cylinder member, and
- a cylindrical protrusion carried by the second end portion, the cylindrical protrusion adapted to selectively engage the at least one pair of substantially diametrically opposed passageways of the first and second end portions of the cylinder member,
- wherein the medial portion of the winch bar member includes a textured surface;

the method comprising:

selectively engaging at least one of the ratchet wrench assembly and the cylindrical protrusion of the winch bar member with the cylinder member of the tie-down winch;

wherein the ratchet wrench assembly engages the polygonal cutout formed in the end of the first end portion of the cylinder member;

wherein the cylindrical protrusion engages the substantially diametrically opposed passageways of the first end portion of the cylinder member; and applying torque force to the winch bar member to cause rotation of the cylinder member.

12. A method according to claim 11 further comprising selectively engaging the ratchet wrench assembly with the cylinder member of the tie-down winch, wherein the ratchet wrench assembly engages the polygonal cutout formed in the end portion of the second end portion of the cylinder member.

13. A method according to claim 11 further comprising selectively engaging the cylindrical protrusion with the pair of substantially diametrically opposed passageways of the second end portion of the cylinder member.

14. A method according to claim 11 further comprising moving the second lock member from the engaged position to the disengaged position so that the cylinder member may freely rotate with respect to the frame.

15. A method according to claim 11 wherein the hollow medial portion of the cylinder member includes at least one strap-receiving passageway formed therethrough.

* * * * *